(12) United States Patent
Pande (10) Patent No.: US 7,668,983 B2
(45) Date of Patent: Feb. 23, 2010

(54) SYSTEM FOR DESIGNING DATA STRUCTURES

(75) Inventor: Anand Pande, Bangalore (IN)

(73) Assignee: Broadcom Corporation, Irvine, CA (US)

(*) Notice: Subject to any disclaimer, the term of this patent is extended or adjusted under 35 U.S.C. 154(b) by 1004 days.

(21) Appl. No.: 10/692,957

(22) Filed: Oct. 24, 2003

(65) Prior Publication Data

US 2005/0091429 A1   Apr. 28, 2005

(51) Int. Cl.
*H03M 1/22* (2006.01)
*H03M 7/14* (2006.01)
*H03M 7/04* (2006.01)
*H03K 21/00* (2006.01)
*G06F 17/00* (2006.01)
*G06F 3/00* (2006.01)
*G06F 9/26* (2006.01)

(52) U.S. Cl. .................. 710/52; 341/10; 341/96; 341/97; 377/33; 377/34; 707/100; 710/57; 711/217; 711/219

(58) Field of Classification Search ........... 341/10, 341/96–98, 1, 9, 50; 707/100, 102, 103 R, 707/103 Y; 711/217–219, 200; 377/27, 33, 377/34; 710/1, 3, 52

See application file for complete search history.

(56) References Cited

U.S. PATENT DOCUMENTS

| 6,337,893 | B1 * | 1/2002 | Pontius | 377/108 |
| 6,553,448 | B1 * | 4/2003 | Mannion | 711/2 |
| 6,703,950 | B2 * | 3/2004 | Yi | 341/97 |
| 6,810,468 | B2 * | 10/2004 | Miyamoto et al. | 711/156 |

* cited by examiner

*Primary Examiner*—Niketa I Patel
*Assistant Examiner*—Richard Franklin
(74) *Attorney, Agent, or Firm*—McAndrews, Held & Malloy, Ltd.

(57) ABSTRACT

Systems and methods for designing data structures are provided. In one embodiment, an asynchronous first-in-first-out (FIFO) data structure may include, for example, a FIFO memory having a depth d in which d is an integer and a code generator coupled to the FIFO memory. The code generator may provide, for example, a first code sequence of length 2d. The first code sequence may have a circular property and a Hamming length of one for any two consecutive codes of the first code sequence. The first code sequence may be generated from a second code sequence by removing one or more pairs of mirrored codes of the second code sequence.

18 Claims, 6 Drawing Sheets

| 0 | 0 | 0 | 0 |
|---|---|---|---|
| 0 | 0 | 0 | 1 |
| 0 | 0 | 1 | 1 |
| 0 | 0 | 1 | 0 |
| 0 | 1 | 1 | 0 |
| 0 | 1 | 1 | 1 |
| 0 | 1 | 0 | 1 |
| 0 | 1 | 0 | 0 |
| 1 | 1 | 0 | 0 |
| 1 | 1 | 0 | 1 |
| 1 | 1 | 1 | 1 |
| 1 | 1 | 1 | 0 |
| 1 | 0 | 1 | 0 |
| 1 | 0 | 1 | 1 |
| 1 | 0 | 0 | 1 |
| 1 | 0 | 0 | 0 |

SYSTEM FOR DESIGNING DATA STRUCTURES

CROSS-REFERENCE TO RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

First-in-first-out (FIFO) data structures have been employed in myriad of applications including, for example, very large scale integration (VLSI). Generally, FIFO data structures may be broadly classified as either synchronous or asynchronous.

A synchronous FIFO data structure may be, for example, a FIFO data structure in which a single clock controls the write port and the read port of the FIFO data structure. A typical objective of the synchronous FIFO design is to provide a mechanism for buffering data and subsequently evacuating the buffered data in the order of arrival.

An asynchronous FIFO data structure may be, for example, a FIFO data structure in which a first clock is used to control the write port and a second clock is used to control the read port of the FIFO data structure. The first clock and the second clock may have completely arbitrary phase relationships. In addition to acting as a buffer, the asynchronous FIFO design has been used as a mechanism that reliably transfers data across asynchronous clock domains.

Conventional asynchronous FIFO data structures may be designed for depths of $2^n$ in which n is an integer. However, being restricted to such depths may be the source of a number of inefficiencies. For example, if an application may be optimized for a FIFO depth of 9, then the use of a FIFO data structure with a depth of $2^4$ (i.e., 16) would not fully use all of the available buffer space and would needlessly consume valuable real estate on a printed circuit board or an integrated system (e.g., an integrated chip). The excessive FIFO data structure design may also disrupt stringent fan-out constraints on clock and data signals.

Further limitations and disadvantages of conventional and traditional approaches will become apparent to one of ordinary skill in the art through comparison of such systems with at least some aspects of the present invention as set forth in the remainder of the present application with reference to the drawings.

BRIEF SUMMARY OF THE INVENTION

Aspects of the present invention may be found in, for example, systems and methods for designing data structures. In one embodiment, the present invention may provide an asynchronous first-in-first-out (FIFO) data structure. The data structure may include, for example, a FIFO memory having a depth d in which d is an integer, and a code generator coupled to the FIFO memory. The code generator may provide, for example, a first code sequence of length 2d. The first code sequence may have a circular property and a Hamming length of one for any two consecutive codes of the first code sequence. The first code sequence may be generated from a second code sequence by removing one or more pairs of mirrored codes of the second code sequence.

In another embodiment, aspects of the present invention may be found in a method for designing an asynchronous data structure. The method may include, for example, one or more of the following: writing data to and reading data from a memory of depth d in which d is not equal to a value $2^n$ and in which d and n are integers; reducing a first Gray-code sequence of length $2^n$ into a second Gray-code sequence of length 2d by removing one or more pairs of mirrored Gray-codes from the first Gray-code sequence; and using Gray codes of the second Gray-code sequence as Gray-code write pointers or Gray-code read pointers.

In yet another embodiment, aspects of the present invention may provide a method that reduces a Gray-code sequence for use with a data structure of arbitrary depth. The method may include, for example, one or more of the following: listing a plurality of codes in a first Gray-code sequence; deleting one or more first codes from the first Gray-code sequence; deleting one or more second codes from the first Gray-code sequence, each second code having identical bits as a corresponding first code except for a most significant bit; and forming a second Gray-code sequence from remaining codes of the first Gray-code sequence.

In another embodiment, aspects of the present invention may be found in a method for designing an asynchronous data structure. The method may include, for example, one or more of the following: writing data to and reading data from a memory of depth d in which d is not equal to a value $2^n$ and in which d and n are integers; reducing a first code sequence of length $2^n$ into a second code sequence of length 2d by removing one or more pairs of mirrored codes from the first code sequence; and using codes of the second code sequence as code write pointers or code read pointers.

In yet another embodiment, aspects of the present invention may provide a method that reduces a code sequence for use with a data structure of arbitrary depth. The method may include, for example, one or more of the following: listing a plurality of codes in a first code sequence; deleting one or more first codes from the first code sequence; deleting one or more second codes from the first code sequence, each second code having identical bits as a corresponding first code except for a most significant bit; and forming a second code sequence from remaining codes of the first code sequence.

These and other features and advantages of the present invention may be appreciated from a review of the following detailed description of the present invention, along with the accompanying figures in which like reference numerals refer to like parts throughout.

DETAILED DESCRIPTION OF THE INVENTION

Some aspects of the present invention may be found, for example, in systems and methods for designing data structures such as, for example, first-in-first-out (FIFO) data structures. Some embodiments according to the present invention may be used with asynchronous FIFO data structures or synchronous FIFO data structures. The depth of the FIFO data structures may be arbitrary and need not be limited to depths of $2^n$ in which n is an integer.

Some embodiments according to the present invention may employ, for example, a Gray-code sequence that has been adapted for use with FIFO data structures of any arbitrary depth. A mirroring property of Gray code sequences may be used to effectively generate codes that are less than $2^n$ in length while still possessing properties suitable for use with FIFO design (e.g., asynchronous FIFO design).

Some embodiments according to the present invention may employ, for example, a code sequence that has been adapted for use with FIFO data structures of any arbitrary depth. The code sequence may be characterized by one or more properties including, for example, a closed property and a Hamming distance of one.

Figure 1:
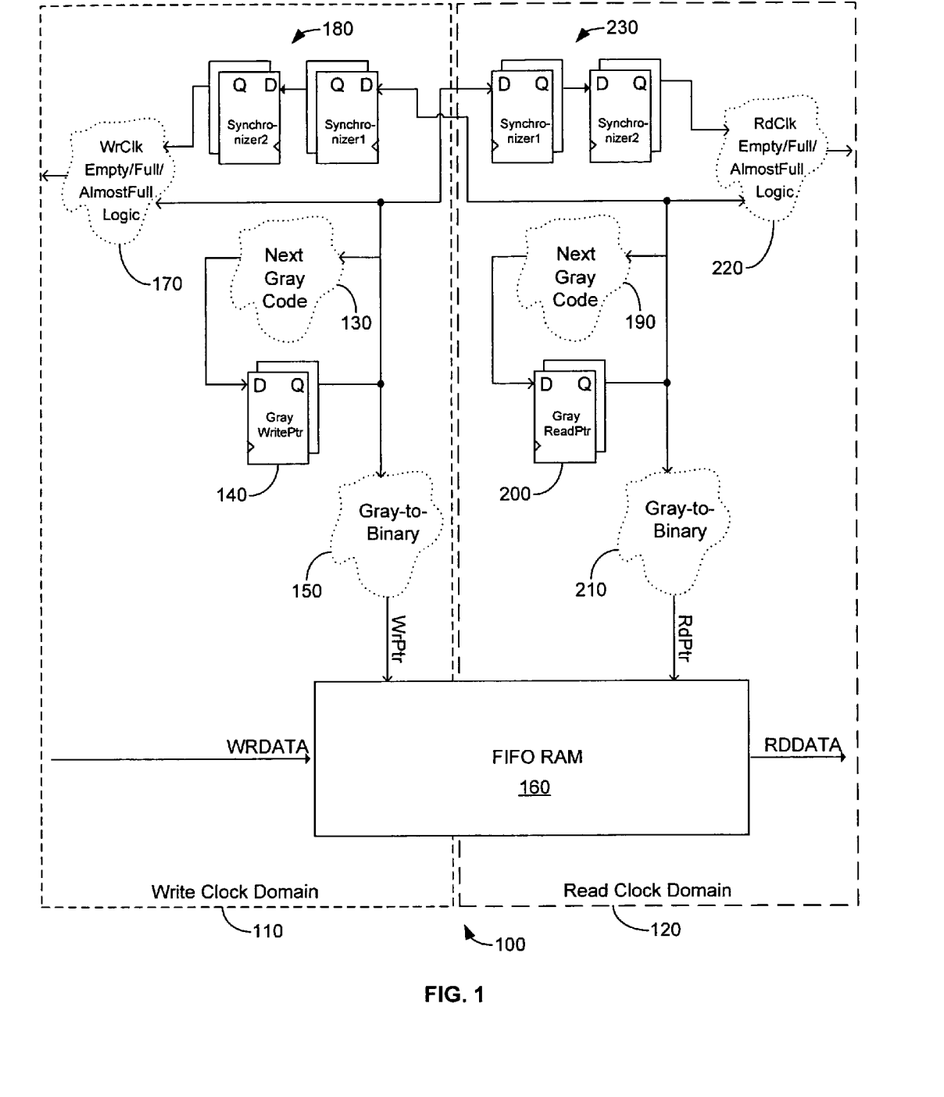
FIG. 1 shows a block diagram illustrating an embodiment of an asynchronous first-in-first-out (FIFO) data structure according to the present invention.

FIG. 1 shows a block diagram illustrating an embodiment of an asynchronous FIFO data structure according to the present invention. The asynchronous FIFO data structure 100 may generally be grouped into a write clock domain 110 and a read clock domain 120. The write clock domain 110 may include, for example, a write clock. The read clock domain 120 may include, for example, a read clock. The write clock and the read clock need not have a phase relationship or a time relationship (e.g., a period relationship). The clocks may be asynchronous. In addition, one or both of the clocks may not be free running.

The write clock domain 110 may include, for example, a Gray-code generator 130, a Gray-code write pointer 140, a Gray-to-binary converter 150, write clock logic 170 related to generating an empty, full or almost full signal, and synchronizers 180. The read clock domain 120 may include, for example, a Gray-code generator 190, a Gray-code read pointer 200, a Gray-to-binary converter 210, read clock logic 220 related to generating an empty, full or almost full signal and synchronizers 230.

The asynchronous FIFO data structure 100 may also include, for example, a FIFO RAM 160 that is part of the write clock domain 110 and the read clock domain 120. The FIFO RAM 160 may include inputs such as, for example, a binary write pointer input, a binary read pointer, a write data port and a write clock. The FIFO RAM 160 may include an output such as, for example, a read data port. The FIFO RAM 160 may have a FIFO depth of any arbitrary depth d in which d is an integer and need not be limited merely to depths of $2^n$ in which n is an integer. In some embodiments, whereas the FIFO depth is d or 2d, the Gray-code sequence length is 2d.

In operation, according to the write clock in the write clock domain 110, a Gray-code write pointer 140 may point to the next Gray-code address to be written. The Gray-to-binary converter 150 may convert the Gray code to a binary code WrPtr which points to a particular binary address in the FIFO RAM 160. Write data WRDATA may then be written into the FIFO RAM 160 at the memory location associated with the binary address WrPtr. After the data is written into the FIFO RAM 160, the Grey count may be incremented according to the Gray-code generator 130. The logic 170 may generate an empty signal, a full signal or an almost full signal depending upon, for example, a relative state of the read pointer and the write pointer. The synchronizers 180 may be used, for example, to synchronize the Gray-code read pointer into the write clock domain 110.

According to the read clock in the read clock domain 120, a Gray-code read pointer 200 may point to the current Gray-code address to be read. The Gray-to-binary converter 210 may convert the Gray code to a binary code RdPtr which points to a particular binary address in the FIFO RAM 160. Read data RDDATA may then be read out of the FIFO RAM 160 from the memory location associated with the binary address RdPtr. After the data is read out of the FIFO RAM 160, the Gray count may be incremented according to the Gray-code generator 190. The logic 220 may generate an empty signal, a full signal or an almost full signal depending upon, for example, a relative state of the read pointer and the write pointer. The synchronizers 230 may be used to synchronize the Gray-code write pointer into the read clock domain 120.

In one embodiment, the asynchronous FIFO data structure 100 may provide resilience towards meta-stability situations that may arise, for example, due to the reception of a read/write pointer from a different clock domain. Gray codes transmitted via synchronizers may provide the resilience. The synchronization scheme may guarantee that the meta-stability resolution time (e.g., the time taken by the synchronizer register to come to a valid logic value of 0 or 1 from a meta-stable state) may be less than the period of the receiving clock. Thus, there may be a change of only one bit of the pointer that is sent across to the other domain. If the changing value is not captured by the current clock edge due to set-up or hold violations, but meta-stability is resolved by the synchronizers, then the changing value may be captured by the next clock edge of the read clock.

In one embodiment, to design an asynchronous FIFO data structure 100 with a depth d in which d is an integer and in which d does not have a value of $2^n$ and in which n is an integer, a code counter may generate a code having circular properties and having a Hamming distance equal to one for any two consecutive codes. One example of such a code is the Gray code. In a Gray-code sequence, any two consecutive codes differ only in the change of one bit position. Furthermore, the Gray-code sequence is closed (i.e., the first code and the last code in the sequence also differ only in the change of one bit position). According to some embodiments of the present invention, an asynchronous FIFO data structure 100 with a depth d is supported by a Gray-code sequence of length 2d.

Figure 2:
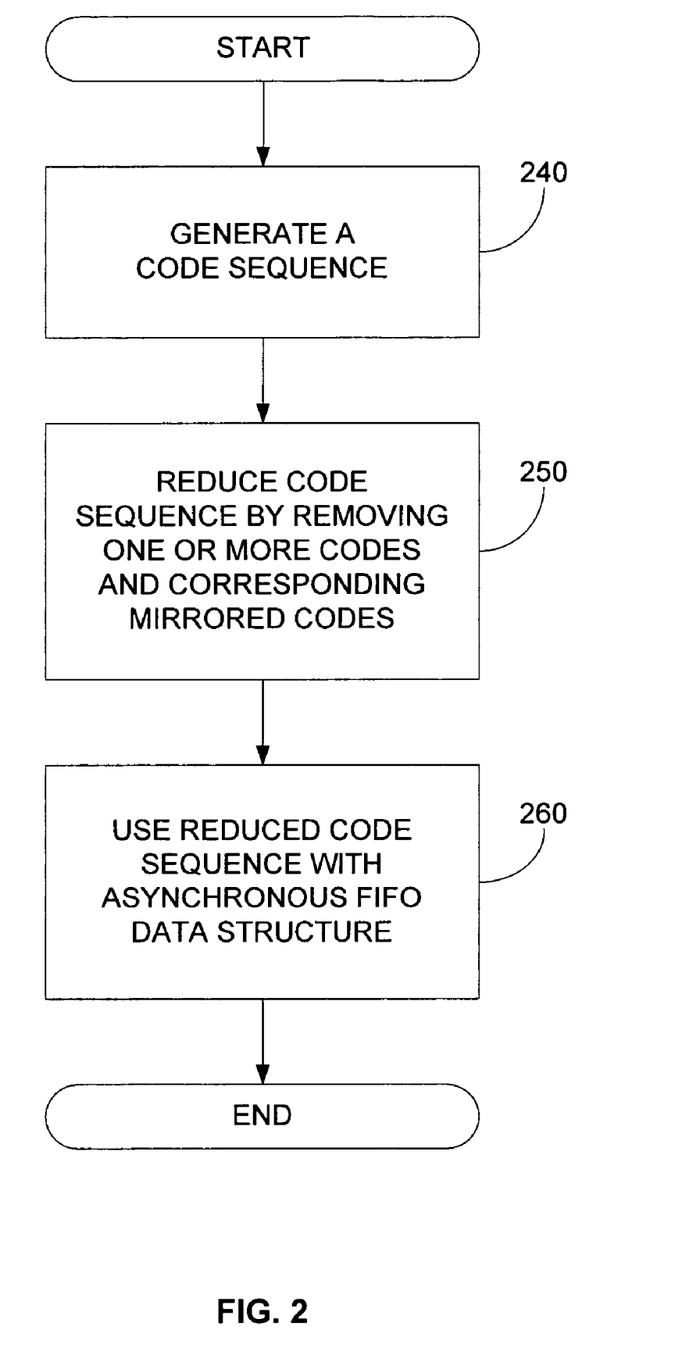
FIG. 2 shows a flow chart illustrating an embodiment of a process that generates a Gray-code sequence according to the present invention.

FIG. 2 shows a flow chart illustrating an embodiment of a process that generates a Gray-code sequence of any length 2d according to the present invention. In step 240, a Gray-code sequence is generated. The Gray-code sequence may be have a length (e.g., $2^n$) greater than the desired length 2d. In step 250, the Gray-code sequence is reduced, for example, by removing one or more codes and the corresponding mirrored codes. The removal of pairs of codes (i.e., a code and its corresponding mirrored code) may reduce the Gray-code sequence to the desired length 2d. In step 260, the reduced code may then be used in the asynchronous FIFO data structure 100. For example, the reduced code of length 2d may be used by the Gray-code generators 130, 190 in generating the Gray-code write pointer and the Gray-code Read pointer.

Figure 3:
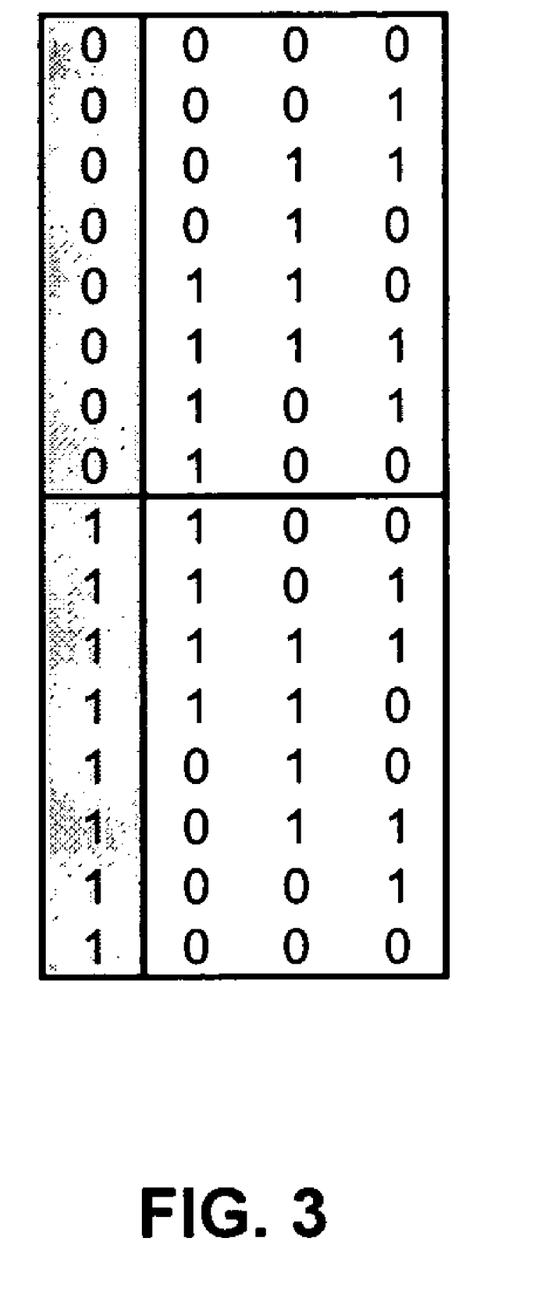
FIG. 3 shows an embodiment of a Gray-code sequence according to the present invention.

FIG. 3 shows an embodiment of a Gray-code sequence according to the present invention. The Gray-code sequence may have a sequence length of 16 and each code may include 4-bits. For illustrative purposes, a centerline may be drawn to evenly divide the sequence into a top portion and a bottom portion. The three least significant bits (LSBs) of each code of the top portion may be mirrored in the bottom portion with respect to the centerline. For example, the three LSBs of Gray-code 0<u>100</u> may be mirrored as 1<u>100</u> with respect to the centerline, the only difference being the most significant bit (MSB) of each code in the mirrored pair. In another example, the three LSBs of Gray-code 0<u>111</u> may be mirrored as 1<u>111</u> with respect to the centerline.

Figure 4:
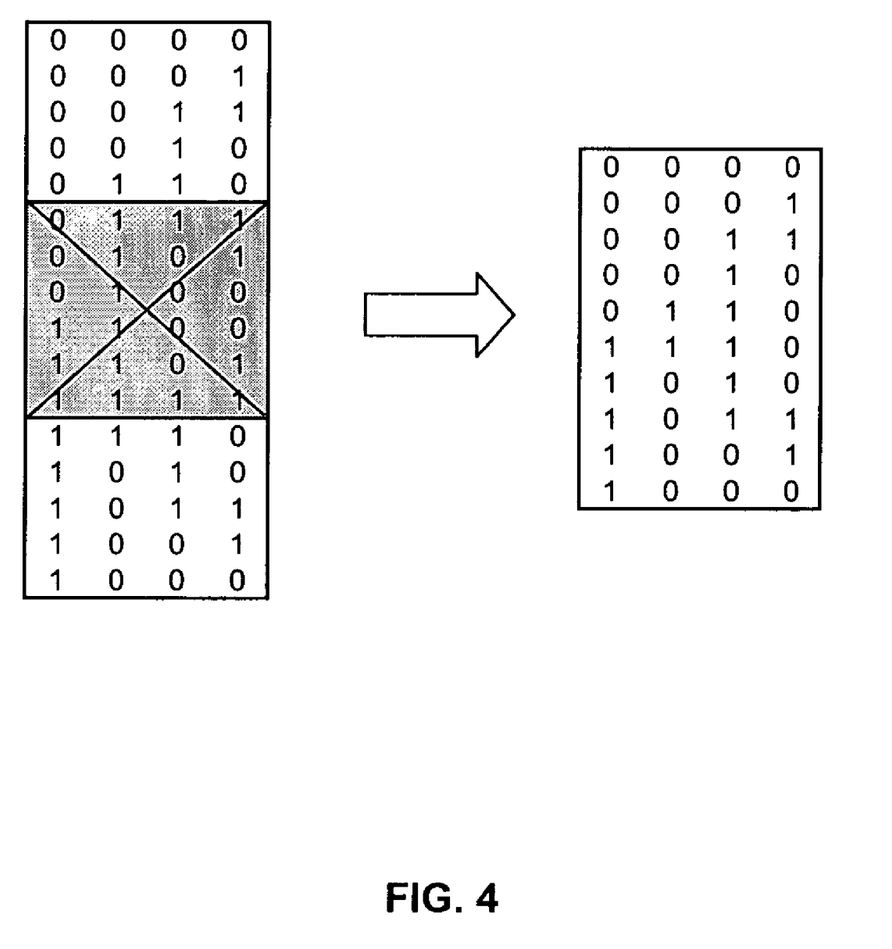
FIG. 4 shows an embodiment of a method for reducing a Gray-code sequence according to the present invention.

FIG. 4 shows an embodiment of a method for reducing a Gray-code sequence according to the present invention. The Gray-code sequence may be reduced by removing a middle portion centered on the centerline. For example, the middle portion may include three mirrored pairs: 0111 and 1111; 0101 and 1101; and 0100 and 1100. With the removal of the middle portion, the original Gray-code sequence may be reduced from a sequence length of 16 to a sequence length of 10. Even though the sequence has been reduced in length, the sequence may still retain its circular properties and have a Hamming distance equal to one for any two consecutive codes.

Figure 5:
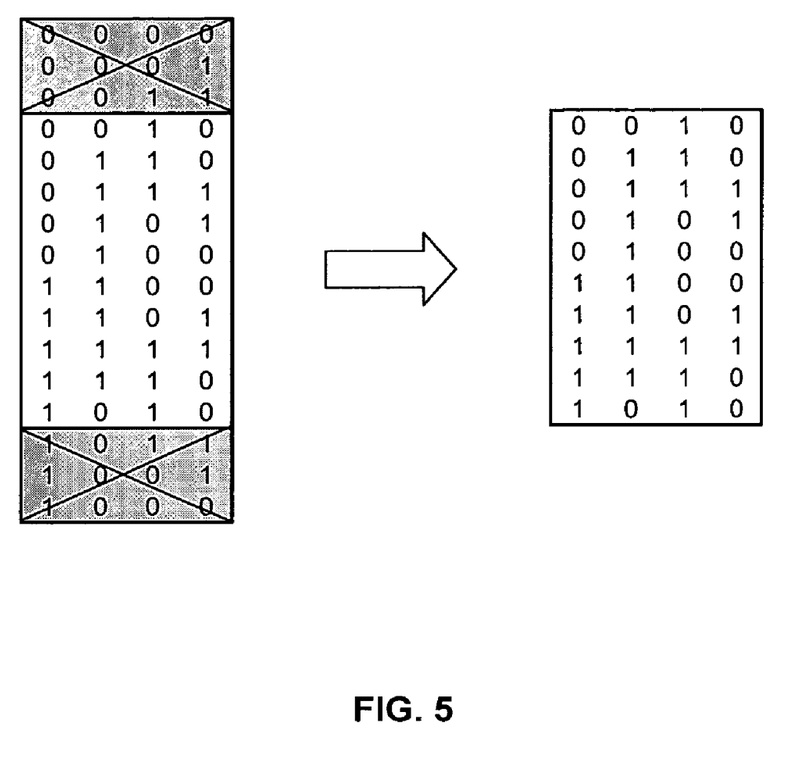
FIG. 5 shows another embodiment of a method for reducing a Gray-code sequence according to the present invention.

FIG. 5 shows another embodiment of a method for reducing a Gray-code sequence according to the present invention. The Gray-code sequence may be reduced by removing a top portion and a corresponding bottom portion (i.e., a mirrored portion with respect to the center line). For example, the top portion and the bottom portion may include three mirrored pairs: 0000 and 1000; 0001 and 1001; and 0011 and 1011. With the removal of the middle portion, the original Gray-code sequence may be reduced from a sequence length of 16 to a sequence length of 10.

Figure 6A:
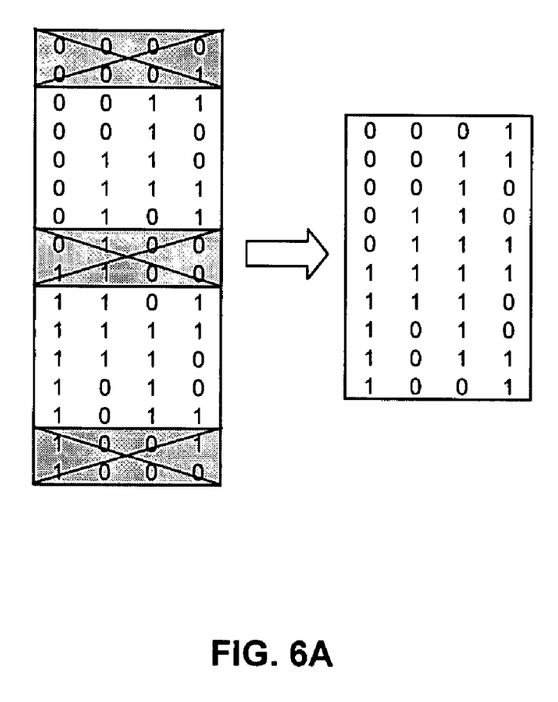
FIGS. 6A-B show two more embodiments of a method for reducing a Gray-code sequence according to the present invention.
Figure 6B:
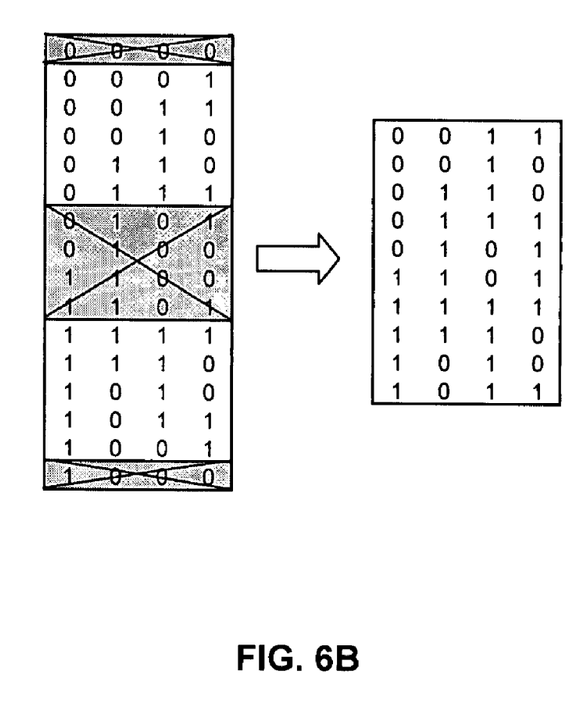

FIGS. 6A-B show two more embodiments of a method for reducing a Gray-code sequence according to the present invention. The Gray-code sequence may be reduced by removing a middle portion and a top portion with a corresponding bottom portion. In FIG. 6A, the middle portion includes a single pair of mirrored codes and the top/bottom portion includes two pairs of mirrored codes. In FIG. 6B, the middle portion includes two pairs of mirrored codes and the top/bottom portion includes a single pair of mirrored codes.

FIGS. 4-6 illustrate, for example, that a particular Gray-code sequence may be reduced a number of different ways to create a number of different reduced sequences. From a plurality of different reduced sequences, an optimal code sequence may be chosen which optimizes the mapping of the transformation function and design of the counters that are used for the read and write pointers.

Some embodiments according to the present invention may have one or more of the following advantages. By releasing the restriction that a FIFO data structure be of depth $2^n$, many inefficiencies may be avoided such as, for example, underused FIFO data structure depth. Furthermore, many of the efficiencies such as excessive FIFO data structure depth may become quite substantial as FIFO data structure width or the number of FIFO data structures increases. In addition, by designing a FIFO data structure of any depth, many of the fan-out constraints on clock and data signals may be maintained.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A first-in-first-out (FIFO) data system, comprising:
a FIFO memory that has a binary write pointer input, a binary read pointer input, a write data input, a write clock input, and a read data output, wherein the FIFO memory comprises a data structure of depth d from which data may be written into using the write data input and read out using the read data output, wherein d is not a value of $2^n$ in which d and n are integers;
an output of a first set of flip flops coupled to an input of a first gray-to-binary converter, an input of a first gray-code generator, an input of a second set of flip flops, and an input of write clock logic that generates a first empty signal, a first full signal, and a first almost full signal;
an output of the first gray-to-binary converter coupled to the binary write pointer input;
an output of the first gray-code generator coupled to an input of the first set of flip flops;
an output of the second set of flip flops coupled to an input of read clock logic that generates a second empty signal, a second full signal, and a second almost full signal;
an output of a third set of flip flops coupled to an input of a second gray-to-binary converter, an input of a second gray-code generator, an input of a fourth set of flip flops, and the input of the read clock logic;
an output of the second gray-code generator coupled to an input of the third set of flip flops;
an output of the second gray-to-binary converter coupled to the binary read pointer input; and
an output of the fourth set of flip flops coupled to the input of the write clock logic.

2. The FIFO data system according to claim 1, comprising:
a read clock; and
a write clock,
wherein the read clock and the write clock do not have a phase relationship.

3. The FIFO data system according to claim 1, comprising:
a read clock; and
a write clock,
wherein the read clock and the write clock do not have a periodic time relationship.

4. The FIFO data system according to claim 1, comprising:
a read clock; and
a write clock,
wherein the read clock and the write clock are asynchronous.

5. The FIFO data system according to claim 1,
wherein the first set of flip flops, the fourth set of flip flops, the first gray-to-binary converter, the first gray-code generator and the write clock logic are part of a write clock domain, wherein the second set of flip flops, the third set of flip flops, the second gray-to-binary converter, the second gray-code generator and the read clock logic are part of a read clock domain, and wherein the FIFO memory is part of both the write clock domain and the read clock domain.

6. The FIFO data system according to claim 5, wherein the fourth set of flip flops are configured to synchronize the third set of flip flops into the write clock domain.

7. The FIFO data system according to claim 5, wherein the second set of flip slops are configured to synchronize the first set of flip flops into the read clock domain.

8. The FIFO data system according to claim 1, wherein the FIFO data system provides resilience towards meta-stability situations.

9. The FIFO data system according to claim 1, wherein the second set of flip flops transmit first gray codes.

10. The FIFO data system according to claim 9, wherein the fourth set of flip flops transmit second gray codes.

11. The FIFO data system according to claim 1, wherein the second set of flip flops and the fourth set of flip flops are part of a synchronization system that guarantees that a meta-stability resolution time is less than a period of a receiving clock.

12. The FIFO data system according to claim 1, wherein the first gray-code generator generates a first gray-code sequence, wherein the first gray-code generator reduces the first gray-code sequence into a second gray-code sequence by removing one or more pairs of gray codes from the first gray-code sequence.

13. The FIFO data system according to claim 12, wherein each gray code of the first-gray code sequence has m bits, wherein m is an integer, wherein each removed pair of gray-codes comprises a first in-bit gray code and a second in-bit gray code, and wherein the first in-bit gray code and the second in-bit gray code of a respective removed pair have the same m−1 least significant bits.

14. The FIFO data system according to claim 12, wherein each of the one or more pairs of gray codes removed from the first gray-code sequence comprises two gray codes that differ only by their respective most significant bits.

15. The FIFO data system according to claim 1, wherein the first gray-to-binary converter receives a gray-code sequence that has been reduced by removing pairs of gray codes, each removed gray-code pair comprises respective gray codes that differ only by their respective most significant bits.

16. The FIFO data system according to claim 1, wherein the first gray-to-binary converter receives a gray-code sequence that has been reduced by removing pairs of gray codes, each removed gray-code pair comprises respective in-bit gray codes that have the same m−1 least significant bits, and wherein m is an integer.

17. The FIFO data system according to claim 1, wherein the FIFO data system is part of a very large scale integration (VLSI).

18. The FIFO data system according to claim 1, wherein the FIFO data system is an asynchronous FIFO data system.

* * * * *

UNITED STATES PATENT AND TRADEMARK OFFICE
CERTIFICATE OF CORRECTION

| | | |
|---|---|---|
| PATENT NO. | : 7,668,983 B2 | Page 1 of 1 |
| APPLICATION NO. | : 10/692957 | |
| DATED | : February 23, 2010 | |
| INVENTOR(S) | : Anand Pande | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 294 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,668,983 B2 | Page 1 of 1 |
| APPLICATION NO. | : 10/692957 | |
| DATED | : February 23, 2010 | |
| INVENTOR(S) | : Anand Pande | |

It is certified that error appears in the above-identified patent and that said Letters Patent is hereby corrected as shown below:

This certificate supersedes the Certificate of Correction issued December 7, 2010.

On the Title Page:

The first or sole Notice should read --

Subject to any disclaimer, the term of this patent is extended or adjusted under 35 U.S.C. 154(b) by 355 days.

Signed and Sealed this
Fifteenth Day of February, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,668,983 B2 | |
| APPLICATION NO. | : 10/692957 | |
| DATED | : February 23, 2010 | |
| INVENTOR(S) | : Anand Pande | |

It is certified that error appears in the above-identified patent and that said Letters Patent is hereby corrected as shown below:

Column 7, line 22 delete "a first in-bit gray code and a second in-bit" and insert -- a first m-bit gray code and a second m-bit --.

Column 7, line 23 delete "in-bit" and insert -- m-bit --.

Column 8, line 1 delete "in-bit" and insert -- m-bit --.

Column 8, line 17 delete "in-bit" and insert -- m-bit --.

Signed and Sealed this
Twenty-eighth Day of June, 2011

David J. Kappos
*Director of the United States Patent and Trademark Office*